(12) United States Patent
Urata et al.

(10) Patent No.: US 10,160,505 B1
(45) Date of Patent: Dec. 25, 2018

(54) VARIABLE-COMPLIANCE, SLIP-RESISTANT FOOT FOR LEGGED MECHANISMS

(71) Applicant: Schaft Inc., Tokyo (JP)

(72) Inventors: Junichi Urata, Tokyo (JP); Masaki Hamafuji, Tokyo (JP)

(73) Assignee: Schaft Inc., Tokyo (JP)

( * ) Notice: Subject to any disclaimer, the term of this patent is extended or adjusted under 35 U.S.C. 154(b) by 0 days.

(21) Appl. No.: 15/092,123

(22) Filed: Apr. 6, 2016

(51) Int. Cl.
| | | |
|---|---|---|
| *B62D 57/032* | (2006.01) | |
| *B29C 65/48* | (2006.01) | |
| *B29C 43/18* | (2006.01) | |
| *B29C 65/00* | (2006.01) | |
| *B29K 21/00* | (2006.01) | |

(52) U.S. Cl.
CPC ............ *B62D 57/032* (2013.01); *B29C 43/18* (2013.01); *B29C 65/48* (2013.01); *B29C 66/7422* (2013.01); *B29K 2021/00* (2013.01)

(58) Field of Classification Search
CPC ....... B62D 57/032; B29C 43/18; B29C 65/48; B29C 66/7422; B29K 2021/00
USPC ......................................................... 180/8.5
See application file for complete search history.

(56) References Cited

U.S. PATENT DOCUMENTS

| | | | |
|---|---|---|---|
| 4,213,255 A | | 7/1980 | Olberz et al. |
| 5,155,927 A | | 10/1992 | Bates et al. |
| 6,018,889 A | | 2/2000 | Friton |
| 6,377,014 B1 | * | 4/2002 | Gomi .................... B62D 57/032 318/568.12 |
| 6,901,313 B2 | * | 5/2005 | Mori ..................... B62D 57/032 180/8.1 |
| 6,992,455 B2 | * | 1/2006 | Kato .................... B25J 19/0091 318/568.1 |
| 7,228,923 B2 | * | 6/2007 | Takenaka ............. B25J 19/0091 180/8.6 |
| 7,905,303 B2 | * | 3/2011 | Takenaka ............... B25J 9/0009 180/8.1 |

FOREIGN PATENT DOCUMENTS

EP           1637050 A1 * 3/2006 ............... A43B 7/36

* cited by examiner

*Primary Examiner* — Anne Marie M Boehler
*Assistant Examiner* — Felicia L. Brittman
(74) *Attorney, Agent, or Firm* — Honigman Miller Schwartz and Cohn LLP

(57) ABSTRACT

An example implementation may involve a robot foot having a bottom surface and an edge portion extending around at least a portion of a perimeter of the foot, where the edge portion meets the bottom surface at the perimeter, where the edge portion surrounds a volume extending from the bottom surface of the foot to a top surface of the edge portion, and where the edge portion of the foot is composed of a first material. The foot may also include an interior portion located adjacent to the edge portion, where the interior portion of the foot fills the volume, and where the interior portion is composed of a second material that is more compliant than the first material.

19 Claims, 5 Drawing Sheets

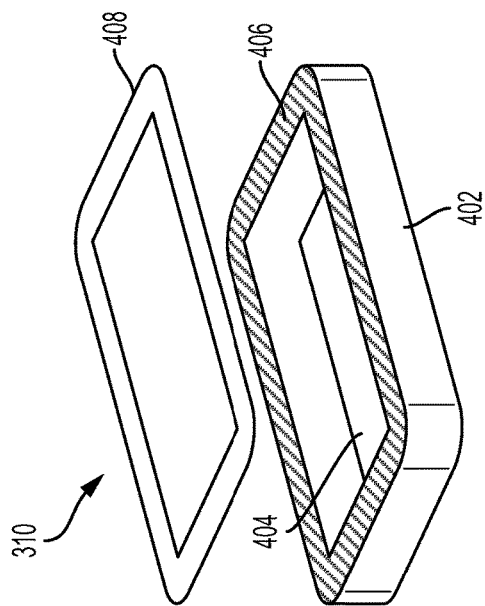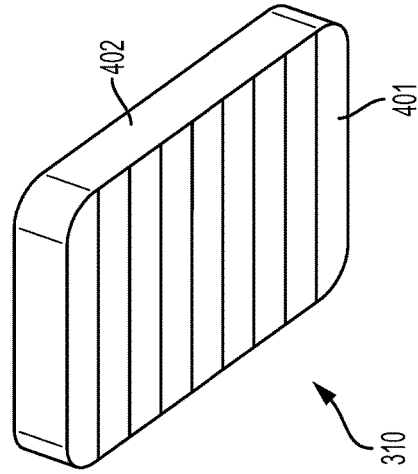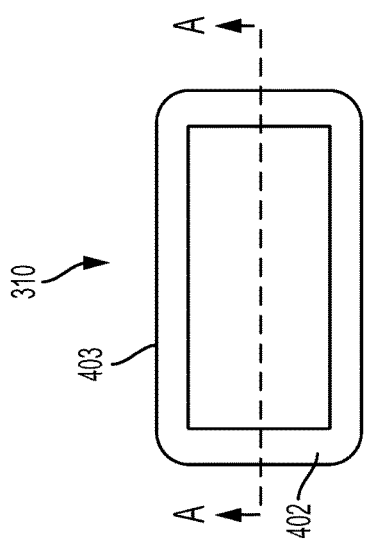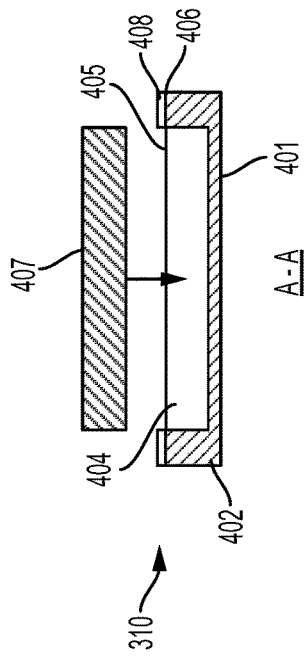

VARIABLE-COMPLIANCE, SLIP-RESISTANT FOOT FOR LEGGED MECHANISMS

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, the desire for efficient robotic systems becomes apparent. Therefore, a demand for efficient robotic systems has helped open up a field of innovation in actuators, movement, sensing techniques, as well as component design and assembly.

SUMMARY

The present disclosure generally relates to a variable-compliance foot for a legged robot. Specifically, implementations described herein discuss a foot for a robot that is composed of two different materials of varying compliance, which may help to reduce the incidence of slipping on uneven terrain. These as well as other aspects, advantages, and alternatives will become apparent to those of ordinary skill in the art by reading the following detailed description, with reference where appropriate to the accompanying drawings.

A first example implementation of a foot for a robot may include a bottom surface; an edge portion extending around at least a portion of a perimeter of the foot, where the edge portion meets the bottom surface at the perimeter, where the edge portion surrounds a volume extending from the bottom surface of the foot to a top surface of the edge portion, and where the edge portion of the foot is composed of a first material; an interior portion located adjacent to the edge portion, where the interior portion of the foot fills the volume, and where the interior portion is composed of a second material that is more compliant than the first material.

A second example implementation may include a robot having at least two legs, each leg including a foot, where each foot includes a bottom surface; an edge portion extending around at least a portion of a perimeter of the foot, where the edge portion meets the bottom surface at the perimeter, where the edge portion surrounds a volume extending from the bottom surface of the foot to a top surface of the edge portion, and where the edge portion of the foot is composed of a first material; an interior portion located adjacent to the edge portion, where the interior portion of the foot fills the volume, and where the interior portion is composed of a second material that is more compliant than the first material.

A third example implementation may include molding, from a first material, an edge portion of a foot for a robot, where the edge portion extends around at least a portion of a perimeter of the foot, and where the edge portion comprises a top surface; punching, from a second material that is more compliant than the first material, an interior portion of the foot; inserting the interior portion of the foot within and adjacent to the edge portion of the foot; and bonding the top surface of the edge portion to a metallic plate.

A fourth example implementation may include a system having means for performing operations in accordance with the third example implementation.

BRIEF DESCRIPTION OF THE DRAWINGS

FIG. 4A illustrates a top view of a robot foot according to an example implementation.

FIG. 4B illustrates a partially exploded cross-sectional view A-A of the robot foot shown in FIG. 4A.

FIG. 4C illustrates an exploded perspective view of a robot foot, according to an example implementation.

FIG. 4D illustrates another perspective view of a robot foot, according to an example implementation.

DETAILED DESCRIPTION

Figure 1:
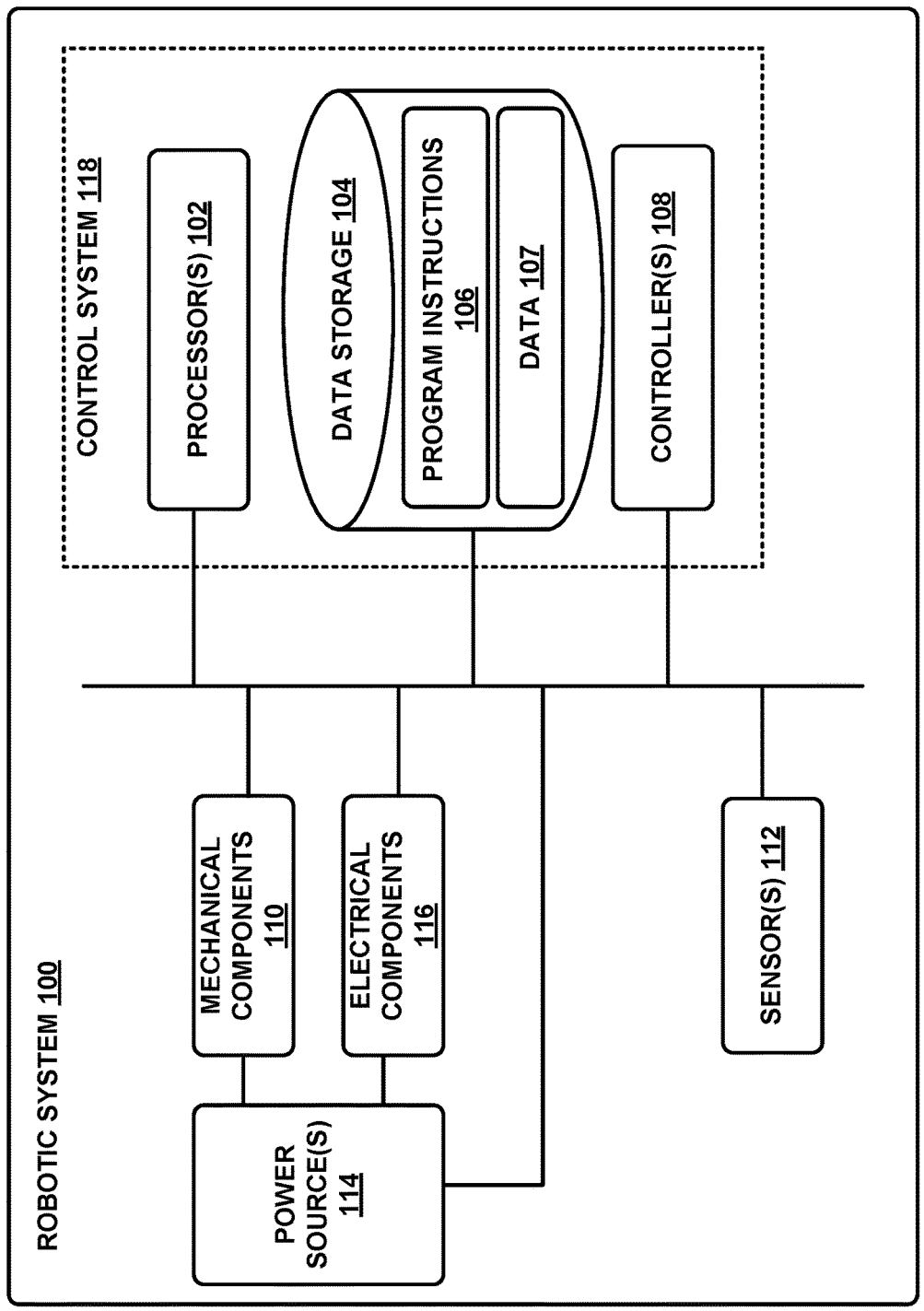
FIG. 1 illustrates a configuration of a robotic system, according to an example implementation.

Example implementations are described herein. The words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. Thus, the aspects of the present disclosure, as generally described herein and illustrated in the figures, can be arranged, substituted, combined, separated, and designed in a wide variety of different configurations, all of which are contemplated herein. Further, unless otherwise noted, figures are not drawn to scale and are used for illustrative purposes only. Moreover, the figures are representational only and not all components are shown. For example, additional structural or restraining components might not be shown.

I. OVERVIEW

Example implementations relate to a variable-compliance, slip-resistant foot for a legged robot. A legged robot may include feet at the end of each leg that are adapted to support the robot's weight as well as reduce the incidence of slipping of the foot with respect to the ground surface. In some cases, such as when the robot walks on a flat surface, a foot that is relatively flat and rigid may be desired. The flat surface area of the foot in contact with the similarly flat surface provides for the frictional force to resist slipping. However, the robot might also encounter uneven terrain. In these cases, a foot that is relatively flat and rigid may not make complete contact with the uneven ground surface. This may result in relatively less friction between the foot and the ground surface and may result in slipping.

For instance, if a relatively flat and rigid foot were to step on a terrain feature that protrudes from the surface, such as a rock, the area of contact between the foot and the surface may be reduced. For example, in this situation the foot may make contact with the surface along just one edge of the foot, in addition to the point where the foot contacts the rock. If the robot were subject to forces inducing a yaw rotation in this condition, the foot's resistance to slipping in the yaw direction would be much lower because of the reduced surface area contact.

For rough terrain, such as many outdoor environments, some compliance, or "give", in the foot may be desirable. This may allow the foot to conform to irregularities of the surface, increasing the surface area that is in contact with the terrain, and thereby increasing the friction to resist slipping. However, a foot that is compliant over its entire surface area may lead to balance issues by introducing pitch and roll variations, particularly if the robot walks on flat terrain, such as a factory floor.

Therefore, in some implementations, the robot's foot may include a bottom surface and an edge portion that extends around at least a portion of a perimeter of the foot. The edge portion may be composed of a first material. The first material may be, for instance, a relatively rigid rubber. The edge portion may surround a volume that extends from the bottom surface to a top of the edge portion. This volume may be filled by an interior portion of the foot, located adjacent to the edge portion. The interior portion may be composed of a second material that is more compliant than the first material. For example, the interior portion may be formed of a more compliant rubber that will compress more under the weight of the robot. Other materials are also possible.

In this configuration, the foot may support the force of the robot's weight primarily on the more rigid, edge portion of the foot when the robot walks on flat terrain. The surface area of substantially the whole footprint may provide resistance to slipping. When irregular terrain is encountered, the more compliant interior portion of the foot may compress, adapting to the shape of the surface and providing greater surface area contact. This, in turn, may reduce the possibility of slips of the robot's foot, particularly yaw slips.

II. EXAMPLE ROBOTIC SYSTEMS

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
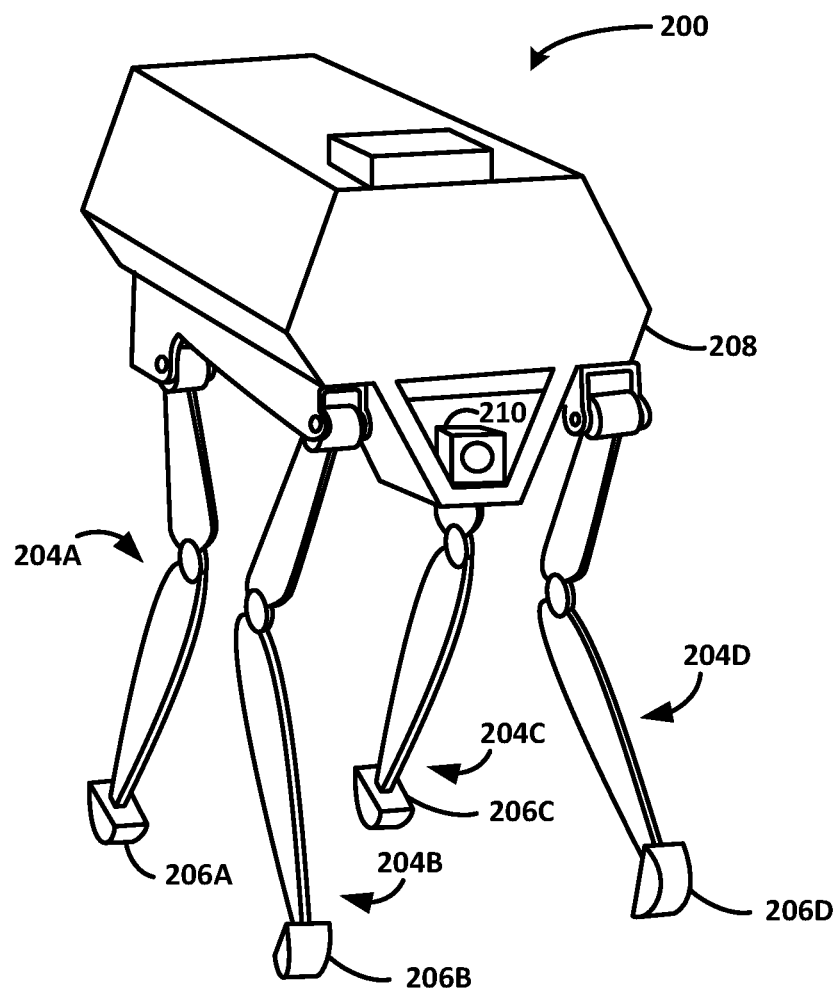
FIG. 2 illustrates a quadruped robot, according to an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
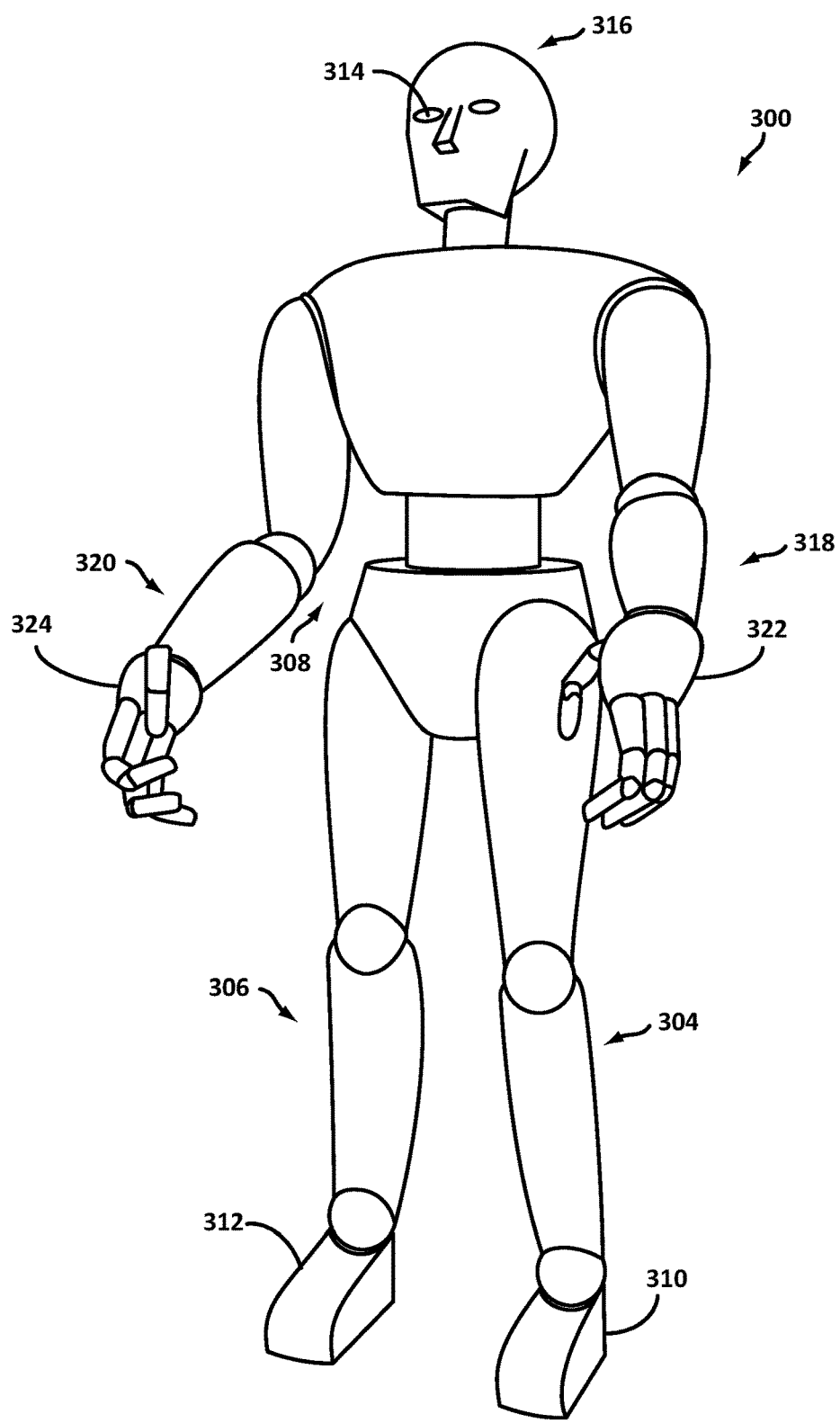
FIG. 3 illustrates a biped robot, according to an example implementation.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

III. EXAMPLE IMPLEMENTATIONS

Figure 5:
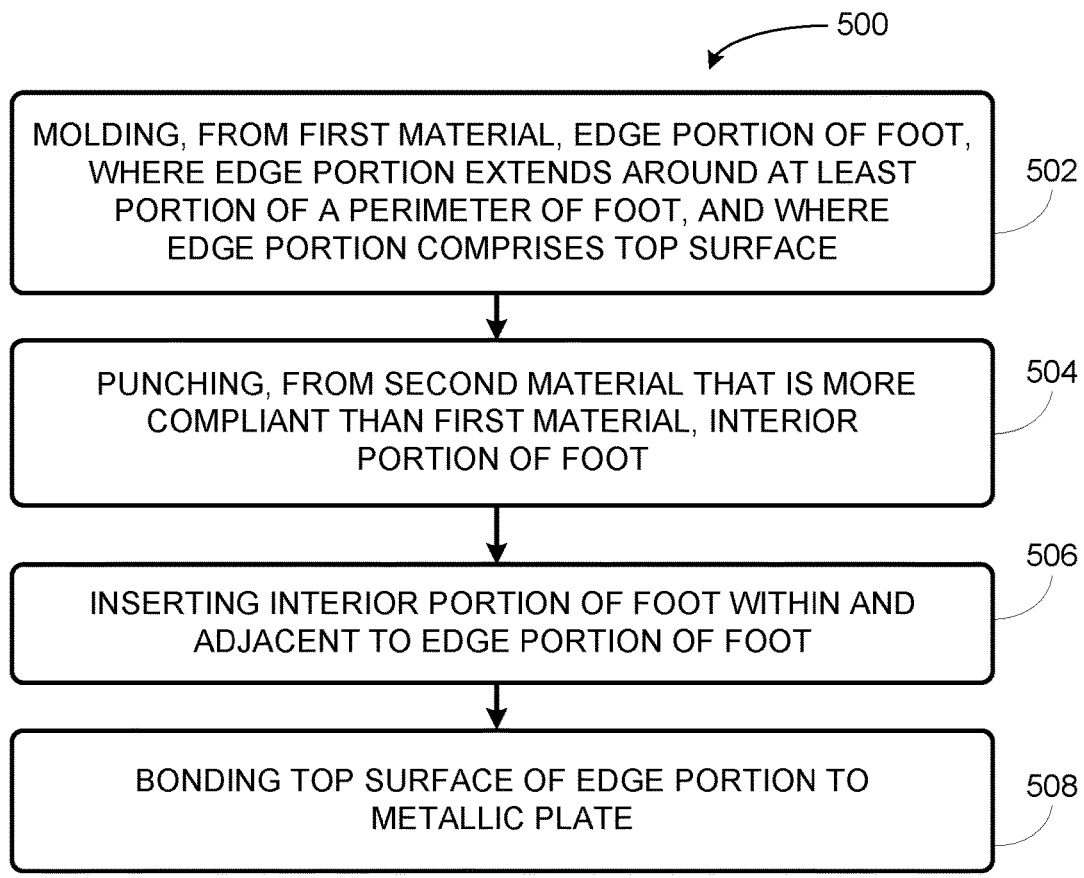
FIG. 5 is a flowchart according to an example implementation.

Example implementations are discussed below involving a variable-compliance, slip-resistance foot for a legged robot. Flow chart 500, shown in FIG. 5, presents example operations that may be implemented in the manufacture of an example foot. Flow chart 500 may include one or more operations or actions as illustrated by one or more of the blocks shown in each figure. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

Further, the term "surface" as used herein is meant to encompass any possible surface or terrain that the robot may encounter, and is not meant to be limiting. For instance, the surface may be indoors or outdoors, may be rigid or loose, such as sand or gravel, and may include discontinuities or irregularities such as stairs, platforms, rocks, fallen trees, debris, and the like. Numerous other examples exist.

A. Example Implementations of a Variable-Compliance, Slip-Resistant Foot

The following paragraphs generally discuss examples involving a biped robot with two feet, however the examples may also be applicable to robots with more feet, such as a quadruped robot with four feet, among others. Further, the implementations discussed below involve examples where a robot is walking forward. However, other gaits are also possible.

FIGS. 4A-4D show an example of a variable-compliance, slip-resistant foot for a robot. The robot may be, for example, the robot 300 shown in FIG. 3, and the foot may be the robot's left foot 310. The robot's foot 310 may include other features in addition to those shown in FIGS. 4A-4D.

FIG. 4A shows a top view of the foot 310, and includes an indication of a cross section A-A, which is shown in partially exploded form in FIG. 4B. The foot 310 may include a bottom surface 401, and an edge portion 402 extending around at least a portion of a perimeter 403 of the foot 310. The edge portion 402 may meet the bottom surface 401 at the perimeter 403, as shown in FIG. 4B.

The edge portion 402 may be composed of a first material that is relatively non-compliant. For example, the edge portion 402 may be composed of a first material that has a Young's modulus within the range of 14,000,000 to 42,000,000 N/m². Thus, the first material may experience relatively little elastic deformation when the weight of the robot 300, which may be as much as 600 N, is carried on the foot 310. The first material may made from a relatively stiff formulation of rubber, for instance. Other materials are also possible.

Further, the edge portion 402 of the foot 310 may surround a volume 404, as shown in FIGS. 4B and 4C. For example, the volume 404 may be defined on its sides by the edge portion 402, and it may extend vertically from the bottom surface 401 to a plane 405, as shown in FIG. 4B. The plane 405 may be parallel to a top surface 406 of the edge portion 402, which can be seen in FIGS. 4B and 4C. In this example, the volume 404 is rectangular in shape, although other shapes may be utilized.

The foot 310 may also include an interior portion 407. The interior portion 407 may be located adjacent to the edge portion 402 and may fill the volume 404 surrounded by the edge portion 402. The interior portion 407 is shown in an exploded view in FIG. 4B for clarity. In this example, the interior portion 407 takes the shape of a rectangular prism corresponding to the volume 404. In this way, the interior portion 407 may be sized to fit within the edge portion 402 and occupy substantially the entire volume 404. In some cases, the interior portion 407 may extend slightly above or terminate slightly below the plane 405, depending on how the foot 310 is attached to the rest of the robot 300.

The interior portion 407 may be composed of a second material that is more compliant than the first material. For instance, the interior portion 407 may be composed of a second material that has a Young's modulus within the range of 100,000 to 1,000,000 N/m². Thus, the interior portion 407 may generally experience greater elastic deformation than the edge portion 402 of the foot 310. The second material may also be rubber, although of a more compliant formulation than the first material. Other possibilities for the second material also exist.

In the configuration discussed above, the foot 310 of the robot 300 may be well-adapted for walking on both flat and rough terrain, while maintaining relatively high slip resistance in both scenarios. For example, on flat surfaces, the robot's weight may be supported primarily on the edge portion 402 of the foot 310. Nonetheless, most or all of the bottom surface 401 of the foot 310 may contact the surface with each step, creating the friction force that results in resistance to slipping.

Further, when the foot 310 encounters rough terrain, the middle portion of the foot 310, below the compliant interior portion 407, may compress and adapt its shape to match that of the terrain. This may allow a greater portion of the foot, including the edge portion 402, to make contact with the surface. This in turn may provide increased resistance to slipping, particularly yaw slipping.

In the example shown in FIGS. 4A-4D, the edge portion 402 is continuous around the perimeter 403 of the foot 310. The edge portion 402 may take other configurations as well. In some embodiments, edge portion 402 may include only a portion of the perimeter. For instance, another example foot may have a rectangular perimeter including four corners, such as that shown in FIGS. 4A-4D. In this example, the more rigid edge portion 402 may include each corner of the foot, but may then be discontinuous between each pair of adjacent corners. Instead, along each of the sides of the foot, the more compliant interior portion of the foot may extend all the way to the perimeter. Alternatively, the perimeter of the foot in between each edge portion may be composed of a third material. Other configurations and materials are also possible.

In some implementations, the bottom surface 401 of the foot 310 may be integrally formed with the edge portion 402, as seen in FIG. 4B. In this configuration, the bottom surface 401 may be composed of a thin layer of the first, more rigid material, with the more compliant interior portion 407 positioned above it. In this way, the first material may provide resistance to wear and tear on the entire bottom surface 401 of the foot 310. Nonetheless, the middle portion of the foot 310 may remain more compliant than the edge portion 402, as the thin layer of the first material may flex under the robot's weight and engage the more compliant interior portion 407 above.

Further, the edge portion 402 of the foot 310 may have a top surface 406, as discussed above. As shown in FIGS. 4B and 4C, the top surface 406 may be parallel to the bottom surface 401, although other configurations are also possible. The top surface 406 may be bonded to a metallic plate 408, such as an aluminum plate. The bonding may be accomplished with an adhesive, for example. The metallic plate for stiffening plate) 408 may provide for an additional, relatively non-compliant layer of material that provides additional support above the weight-bearing edge portion 402 of the foot 310. Additionally, the foot 310 may be attached to the robot 300 via the metallic plate 408. For instance, the metallic plate 408 may attach to the robot 300 with screws, or via numerous other known attachment mechanisms.

In some examples, the interior portion 407 of the foot 310 may be bonded to the edge portion 402, such as with an adhesive. In other implementations, the interior portion 407 may not be bonded to the edge portion 402, such that the interior portion 407 is removable. This may be desirable in some instances. If, for instance, the robot 300 is expected to operate on a known terrain, without variation, a second material might be specifically selected for the interior portion 407. As an example, the robot 300 may operate on a hard, flat factory floor for an extended period of time. Here, the relatively more compliant interior portion 407 may be replaced with an interior portion composed of the more rigid first material. This may allow the robot's weight to be distributed more evenly across a greater area of the foot 310, whereas the edge portion 402 would otherwise bear most of the robot's weight if the more compliant interior portion 407 were left in place. In this example, replacing the interior portion 407 with the more rigid first material might result in reducing the fatigue on the edge portion 402 over time.

B. Example Implementation of Making a Variable-Compliance, Slip-Resistant Foot

FIG. 5 is a flowchart 500 illustrating operations for manufacturing a variable-compliance, slip-resistant foot, such as the foot 310 for the robot 300 discussed above. At block 502, manufacturing the foot 310 may involve molding, from a first material, an edge portion 402 of the foot 310. The edge portion 402 may be molded such that it extends around at least a portion of a perimeter 403 of the foot 310. Further, the edge portion 402 may include a top surface 406.

In some cases, molding the edge portion 402 of the foot 310 may include molding the bottom surface 401, also from the first material. The bottom surface 401 may be molded integrally with the edge portion 402 such that they surround a volume 404. The volume 404 may extend from the bottom surface 401 to a plane 405 that is parallel with the top surface 406 of the edge portion 402.

At block 504, manufacturing the foot 310 may include punching, from a second material that is more compliant than the first material, an interior portion 407 of the foot 310. For example, the interior portion 407 may be punched from a sheet of the second material having a thickness that corresponds to the desired height of the interior portion 407.

At block 506, manufacturing the foot 310 may include inserting the interior portion 407 of the foot 310 within and adjacent to the edge portion 402. The interior portion 407 may also be inserted on top of to the bottom surface 401, thereby filling the volume surrounded by the edge portion 402 and the bottom surface 401. In some cases, inserting the interior portion 407 may further involve bonding the interior portion 407 of the foot 310 to the edge portion 402.

At block 508, manufacturing the foot 310 may include bonding the top surface 406 of the edge portion 402 to a metallic plate 408, such as an aluminum plate. The bonding may involve applying an adhesive that may be, for example, heat activated. Other bonding operations are also possible. Assembly of the foot 310 may further involve attaching the foot 310 to the robot 300. This may be accomplished via the metallic plate 408 using, for example, screws, or any other known attachment mechanism.

IV. CONCLUSION

While various implementations and aspects have been disclosed herein, other aspects and implementations will be apparent to those skilled in the art. The various implementations and aspects disclosed herein are for purposes of illustration and are not intended to be limiting, with the scope being indicated by the following claims.

We claim:

1. A foot for a robot, the foot comprising:
   a bottom surface having a ground-engaging side and an interior side, the interior side disposed on an opposite side of the bottom surface than the ground-engaging side;
   an edge portion having a top surface defining an opening, the edge portion extending around at least a portion of a perimeter of the foot from the bottom surface to the top surface, the edge portion having an interior edge that surrounds an interior volume extending from the bottom surface to a plane extending parallel to the top surface of the edge portion, wherein the edge portion is rigid and comprises a first material;
   an interior portion received within the interior volume on the interior side of the bottom surface and adjacent to the edge portion, the interior portion comprising:
      a lower surface in opposed contact with the interior side of the bottom surface; and
      an upper surface disposed on an opposite side of the interior portion than the lower surface and entirely exposed to the atmosphere by the opening defined by the top surface of the edge portion,
      wherein the interior portion comprises a second material that is more compressible than the first material; and
   a stiffening ring disposed on the top surface of the edge portion, the stiffening ring comprising a third material different and less compressible than the second material.

2. The foot of claim 1, wherein the edge portion is continuous around the perimeter of the foot.

3. The foot of claim 1, wherein the perimeter of the foot is a rectangular shape and comprises four corners, wherein the edge portion comprises each corner of the perimeter of the foot, and wherein the edge portion is discontinuous between each pair of adjacent corners.

4. The foot of claim 1, wherein the bottom surface is composed of the first material and is integrally formed with the edge portion.

5. The foot of claim 1, wherein the top surface of the edge portion is parallel to the bottom surface of the foot.

6. The foot of claim 1, wherein the interior volume surrounded by the edge portion is a rectangular volume, and wherein the interior portion of the foot is a rectangular prism corresponding to the rectangular volume.

7. The foot of claim 1, wherein the stiffening ring is bonded to the top surface of the edge portion and comprises a metallic plate.

8. The foot of claim 7, wherein the foot is attached to the robot via the metallic plate.

9. The foot of claim 1, wherein the interior portion of the foot is bonded to the edge portion of the foot.

10. The foot of claim 1, wherein the stiffening ring is a continuous ring disposed along a perimeter of the top surface of the edge portion.

11. A robot comprising:
at least two legs, each leg comprising a foot, wherein each foot comprises:
   a bottom surface having a ground-engaging side and an interior side, the interior side disposed on an opposite side of the bottom surface than the ground-engaging side;
   an edge portion having a top surface defining an opening, the edge portion extending around at least a portion of a perimeter of the foot from the bottom surface to the top surface, the edge portion having an interior edge that surrounds an interior volume extending from the bottom surface to a plane extending parallel to the top surface of the edge portion, wherein the edge portion of the foot is rigid and comprises a first material;
   an interior portion received within the interior volume upon the interior side of the bottom surface and adjacent to the edge portion, the interior portion comprising:
      a lower surface in opposed contact with the interior side of the bottom surface; and
      an upper surface disposed on an opposite side of the interior portion than the lower surface and entirely exposed to the atmosphere by the opening defined by the top surface of the edge portion,
      wherein the interior portion comprises a second material that is more compressible than the first material; and
   a stiffening ring disposed on the top surface of the edge portion, the stiffening ring comprising a third material different and less compressible than the second material.

12. The robot of claim 11, wherein the edge portion is continuous around the perimeter of the foot.

13. The robot of claim 11, wherein the perimeter of the foot is a rectangular shape and comprises four corners, wherein the edge portion comprises each corner of the perimeter of the foot, and wherein the edge portion is discontinuous between each pair of adjacent corners.

14. The robot of claim 11, wherein the bottom surface is composed of the first material and is integrally formed with the edge portion.

15. The robot of claim 11, wherein the top surface of the edge portion is parallel to the bottom surface of the foot.

16. The robot of claim 11, wherein the interior volume surrounded by the edge portion is a rectangular volume, and wherein the interior portion of the foot is a rectangular prism corresponding to the rectangular volume.

17. The robot of claim 11, wherein the stiffening ring is bonded to the top surface of the edge portion and comprises a metallic plate.

18. The robot of claim 11, wherein the interior portion of the foot is bonded to the edge portion of the foot.

19. The robot of claim 11, wherein the stiffening ring is a continuous ring disposed along a perimeter of the top surface of the edge portion.

* * * * *